Feb. 25, 1969 O. RÖSNER ET AL 3,429,997

IMAGE FLATTENING OPTICAL SYSTEM FOR ELECTRONIC IMAGE CONVERTING TUBE

Filed Aug. 18, 1965

INVENTORS
ORTWIN RÖSNER
FRANZ SCHLEGEL
NIKOLAUS SEBESTYEN
By: McGlew and Toren
ATTORNEYS 3,429,997

IMAGE FLATTENING OPTICAL SYSTEM FOR ELECTRONIC IMAGE CONVERTING TUBE

Ortwin Rösner and Franz Schlegel, Munich, and Nikolaus Sebestyen, Uberlingen (Bodensee), Germany, assignors to Optische Werke G. Rodenstock, Munich, Germany Filed Aug. 18, 1965, Ser. No. 480,582
U.S. Cl. 178—7.86 7 Claims
Int. Cl. H01j *29/89;* G02b *3/00, 9/34*

ABSTRACT OF THE DISCLOSURE

An electronic image converting tube, of the type generally known as iconoscopes, is associated with a geometrical-optical system for directing light rays into a convex cathode surface of the tube. A Smyth lens is positioned in the path of light rays entering the tube and is either cemented on the outwardly convex cathode surface or is integral with the latter. The Smyth lens may be a two part lens with a color filter sandwiched between the two parts thereof.

*Background of the invention*

This invention relates to geometrical-optical refracting or reflecting systems for reproducing images on the receiving or cathode surfaces of electronic image converters and similar devices. More particularly, the present invention is directed to an improved combination of a geometrical-optical system and an electronic picture tube by which the image of the normally convex cathode or reproduction surface appears flattened in a Smyth lens immediately adjacent the cathode surface, or contiguous or common therewith, so that the preceding geometrical-optical objective may provide a flat image field.

By virtue of the electronic-optical laws of reproduction, electronic-optical image converters have a reproduction or cathode surface which is outwardly convex. That is, such surfaces provide, in the geometrical-optical sense, a positively curved image receiving surface. Consequently, the preceding geometrical-optical system must be capable of adapting the curvature of the image field to that of the receiving surface of the electronic-optical image converter.

Generally, however, optical systems have a flattened image field with residual curvature, or with an image field curvature which is eliminated only partially or not at all, tending toward the negative sign. Consequently, the curvature is more or less sharply concave with respect to the direction of radiation.

The technical expedients, used, for example, in photographic objectives of conventional design to provide a flattened image field, such as combinations of glasses with certain relations between refraction indices and chromatic aberration, usually are just barely sufficient to flatten the image field. In order to impart a positive curvature to the image field, over and above the flattening thereof, additional means are needed which have as little influence as possible on other errors of image reproduction. Such additional means usually comprises a Smyth dispersion lens just before the image surface or plane.

If possible, the Smyth lens is so arranged that the image surface coincides with the last surface of the dispersion lens or is at least closely adjacent thereto. The result of this is that the dispersion lens forms part of the overall objective, and the latter thus has a respective image field curvature which is suitable for only one kind of electron picture tube. Additionally, there is a very short back focal length, of practically zero. Thus, an objective of this type is limited, as to usefulness, substantially exclusively to one type of picture tube. This is very uneconomical, as a special objective therefore must be provided for each type of electronic picture tube.

Another disadvantage of known objectives used with electronic image converters is that the objective, and thus the support or tube for its lenses, which latter is generally of metal, must be brought very close to the electronic picture tube. The objective and the tube must be centered relative to each other by additional devices, and this centering frequently results in damage to the tube which sometimes causes destruction of the latter. Moreover, and particularly at its cathode end, the tube has a high electric potential. When close to the grounded objective mounting, this high potential creates a strong electric field tending to spark over or break down. In order to avoid accidents from this phenomenon, the tube must be well insulated, which also considerably complicates its combining with the objective.

An object of the present invention is to provide, in the combination of a geometrical-optical system with an electronic image converter, for the separation of a Smyth lens from the objective.

Another object of the invention is to combine the Smyth lens with the electronic picture tube.

A further object of the invention is to provide the Smyth lens with optical parameters of such a nature that the image of the cathode reproduction surface of the electronic picture tube appears flattened, whereby the objective positioned in advance of the electronic picture tube may have a flat image field.

Yet another object of the invention is to provide a combination of a geometrical-optical system with an electronic picture tube in which the objective is a substantially standard photographic objective.

A still further object of the invention is to provide a combination of a geometrical-optical objective and an electronic picture tube in which the objective has a sufficient back focal length that it may be arranged, for purposes of electrical insulation, at a sufficient distance from the tube to avoid any danger of electric flashover.

Still another object of the invention is to provide the combination of a geometrical-optical objective and an electronic picture tube in which the objective need not be carefully adjusted with respect to the tube axis provided that the optical axis is perpendicular to the apparently flattened image of the cathode or reproduction surface of the electronic picture tube.

In carrying out the invention, the field or Smyth lens may be secured to the electron picture tube purely mechanically so that its centered position with respect to the convex reproduction surface of the tube can be checked at any time and, if necessary, adjusted. It is an advantage if the field or Smyth lens has dimensions such that its edge projects and thus forms a protective ring in the form of an annular disk electric insulator. Advantageously, the surface of the field or Smyth lens facing the convex tube surface can have a curvature such that it may be cemented in surface-to-surface relation with the tube. Thus, the field lens can be centered during the cementing, its position is invariable, and the danger of reflection at the facing surfaces of the lens and the tube is eliminated, with the transparency of the optical system being increased.

As a further feature of the invention, the field or Smyth lens may be formed in such a manner that it can be fused in place with the other parts of the picture tube as a component part of the tube, and so that it can carry the cathode layer directly on its inner or rear surface. In order to guard against thermal stresses, intermediate glasses, in annular form, may be inserted in a known manner.

While a Smyth field lens thus combined with the tube eliminates the image field curvature, it furthermore acts on the other image reproduction errors which must be eliminated, particularly if the preceding objective has a general or overall correction, as, for example, if it is a photographic objective. Thus it is possible, for example, to eliminate the color magnification error of the Smyth lens by virtue of the fact that the forward surface of the Smyth lens, facing the objective, has a center of curvature in the exit pupil of the preceding objective. With this relation, all of the main rays pass through the Smyth lens perpendicularly, and there is no breakdown of the rays into different colors. This is important in order that highly refractive, comparatively cheap, flint glass may be used for the Smyth lens.

If this condition is to be fulfilled concurrently with image field flattening, for the lens cemented to the tube, then the relation between the index refraction $n$ of the glass of the Smyth lens, its first radius $r_1$ which is equal but opposite to the pupil width $p'_1$ of the objective, and its radius $r_2$, corresponding to the radius of the cathode surface, must be as follows:

$$(n-1)=p'/(r_2-p')$$

In accordance with a further feature of the invention, the Smyth lens may be extended into a multi-lens system for the purpose of correcting or eliminating further production errors, for the purpose of uniting it in a common mounting with the electron picture tube, or for the purpose of using the last lens with the tube. Thus it is possible so to design the last lens of the Smyth system with the preceding component parts so that they are easy to center with the last lens.

Finally, the Smyth lens may have associated therewith a color filter which may be cemented thereto. For instance, the color filter may be glass solidly colored in mass. The filter may be inserted, for example, between the electron picture tube and the Smyth lens, as a meniscus of practically zero refractive power, or may be inserted as a plane plate between two plano-concave lenses conjointly constituting the Smyth lens. By this arrangement, not only is the cathode surface protected from radiations which are harmful to it, but also a reflection counter to the direction of radiation is suppressed. Such reflection, as experience has shown, leads to inferior contrast.

For an understanding of the principles of the invention, reference is made to the following description of typical embodiments thereof as illustrated in the accompanying drawings.

Figures 1, 2, 3:
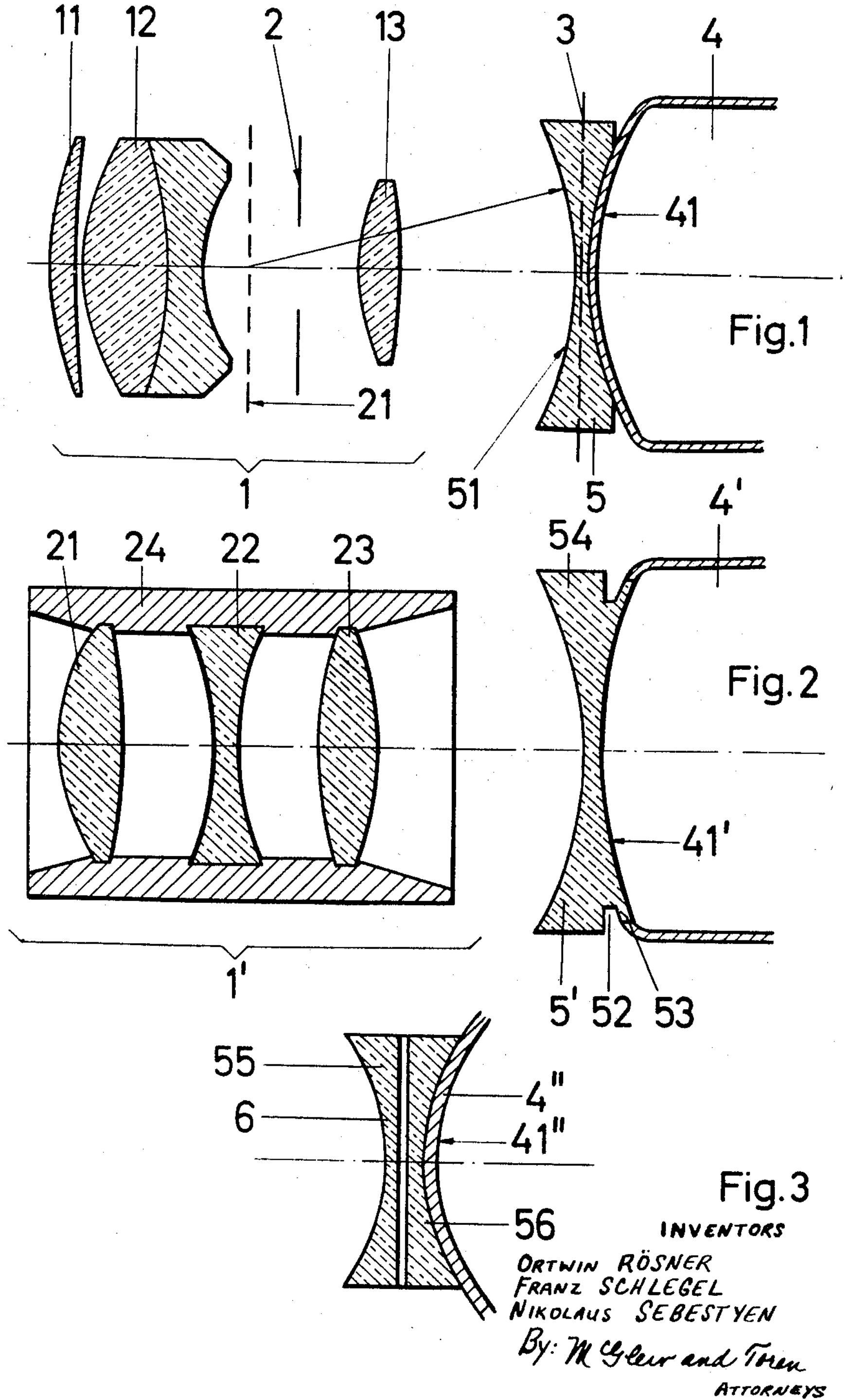
FIG. 1 is a somewhat schematic axial section view through one embodiment of a combined geometrical-optical and optical-geometrical system in accordance with the invention.
FIG. 2 is a view, similar to FIG. 1, illustrating another embodiment of the invention.
FIG. 3 is an axial sectional view through the cathode surface of an electron picture tube and a field lens thereon, illustrating an embodiment of the invention incorporating a color filter.

Referring to FIG. 1, a high speed objective 1 is illustrated as including lens components 11, 12 and 13. Components 11 and 12 are positioned, with respect to the direction of entering light rays, in advance of a shutter 2, whereas component 13 is positioned rearwardly of shutter 2. The image of a remote object, as formed by objective 1, lies in the plane 3.

The electron picture tube 4 has a cathode surface 41 which is outwardly convex. A Smyth lens 5 has a concave surface which conforms in curvature to the convex surface 41, and the concave surface of Smyth lens 5 is cemented to the convex surface 41. The optical parameters of Smyth lens 5 are selected so that the convexly curved surface 41, when viewed through Smyth lens 5, appears in the plane 3. Thus there is apparent coincidence between the image plane of objective 1 and the plane of the image of convex surface 41.

As stated, it is desirable to eliminate the color magnification error of Smyth lens 5. For this purpose, the radius of the forward concave surface 51 of Smyth lens 5 is made equal to the distance of surface 51 from the exit pupil of objective 1. The exit pupil of objective 1 corresponds to the position of the virtual image 21 of the shutter 2 as projected by the objective component 13.

Referring to FIG. 2, the objective 1' comprises components 21, 22, 23, positioned in a mount such as tube 24. In this example, the Smyth lens 5' forms an integrated component of the electron picture tube 4. Thus, the rear concave surface 41' of Smyth lens 5' forms the cathode surface of tube 4. The lens 5' is formed with an annular notch 52 produced by grinding and providing a fin or flange 53 which is fused with tube 4. To avoid thermal stresses, an annular glass piece may be inserted between the periphery of fin 53 and the tube 4, but this has not been illustrated.

The protruding edge 54 of Smyth lens 55 acts as an annular disk insulator against electrical flashover from cathode surface 41' toward the objective mount 24, which is generally formed of metal. The parameters of lens 5' are again selected so that the image of surface 41' appears in the central diametric plane of lens 5', and the parameters of objective 1' are so selected that the flattened image formed thereby also appears in this diametric plane. The radius of the forward concave surface of lens 5' is again equal to the distance of this surface from the exit pupil of objective 1'.

FIG. 3 illustrates an embodiment of the invention in which a color filter 6 is incorporated in the Smyth lens. Referring to FIG. 3, the Smyth lens is divided into a forward part 55 and a rear part 56, both of which are plano-concave components. The concave rear surface of rear component 56 conforms in curvature to the cathode surface 41'' of the tube 4'', and this rear concave surface is cemented to the cathode surface 41''. The plane parallel surfaces of components 55 and 56 are separated axially, and a plane color filter 6, in the form of a flat plate, is cemented between components 55 and 56 which form the Smyth lens. The components 55, 56 and 41'' are all cemented together as a unit.

While specific embodiments of the invention have been shown and described in detail to illustrate the application of the principles of the invention, it will be understood that the invention may be embodied otherwise without departing from such principles.

What is claimed is:

1. A device for flattening the image field of an electronic camera tube, having means forming an outwardly convex cathode surface at the light entering end of the tube, operatively associated with a geometrical-optical image reproducing system in advance of said surface in the path of light rays entering the tube, said device comprising a Smyth lens mounted on the light ray entering end of said tube, said Smyth lens having optical parameters effective to provide a substantially flat image of said convex cathode surface, said optical system having a substantially flat image field; the concave surface of said Smyth lens facing said optical system having a center of curvature lying in the exit pupil of said optical system; the relation of the index of refraction of said Smyth lens to its optical parameters and to the pupil width of said optical system satisfying the equation;

$$(n-1)/n=p'/(r_2-p')$$

where $n$ equals the index of refraction, $p$ equals the pupil width of said optical system, and $r_2$ equals the radius of said convex cathode surface.

2. A device for flattening the image field of an electronic camera tube, as claimed in claim 1, in which Smyth lens comprises a component of an optical system corrected for image reproduction errors.

3. A device for flattening the image field of an electronic camera tube, as claimed in claim 1, including a color filter operatively associated with said Smyth lens and in the path of light rays entering said tube.

4. A device for flattening the image field of an electronic camera tube, as claimed in claim 3, in which color filter is interposed between said Smyth lens and said tube.

5. A device for flattening the image field of an electronic camera tube, as claimed in claim 3, in which said Smyth lens comprises two axially separated components having spaced parallel facing surfaces; said color filter being positioned between said last-named surfaces.

6. A device for flattening the image field of an electronic camera tube, as claimed in claim 5, in which said color filter and the components of said Smyth lens are cemented together in surface-to-surface relation.

7. A device for flattening the image field of an electronic camera tube, as claimed in claim 1, in which said Smyth lens is integral with said tube on the light entering end thereof, and comprises said means forming the outwardly convex cathode surface; said geometrical-optical image reproducing system including a metal housing; said Smyth lens having a rim projecting radially outwardly of the light entering end of said tube and said rim having a diameter in excess of the diameter of said housing; said rim serving as an electrical insulator protecting against electric flash over from said cathode surface to the housing of said geometrical-optical image reproducing system.

References Cited

UNITED STATES PATENTS

| | | | |
|---|---|---|---|
| 1,230,136 | 6/1917 | Draper | 350—195 |
| 2,172,775 | 9/1939 | Schmidt-Ott et al. | 178—7.85 |
| 2,419,177 | 4/1947 | Steadman | 313—92 |
| 2,446,843 | 8/1948 | Merritt | 350—195 |
| 2,494,992 | 1/1950 | Ferguson | 178—7.86 |
| 2,531,956 | 11/1950 | Waldorf et al. | 350—183 |

ROBERT L. GRIFFIN, *Primary Examiner.*

R. K. ECKERT, Jr., *Assistant Examiner.*

U.S. Cl. X.R.

178—7.85; 350—195, 220, 224, 232